June 30, 1970

R. N. LOGAN 3,518,342

CENTRIFUGAL MOLDING METHOD FOR MAKING FACING
FOR BUILDING BLOCKS

Filed Nov. 15, 1968

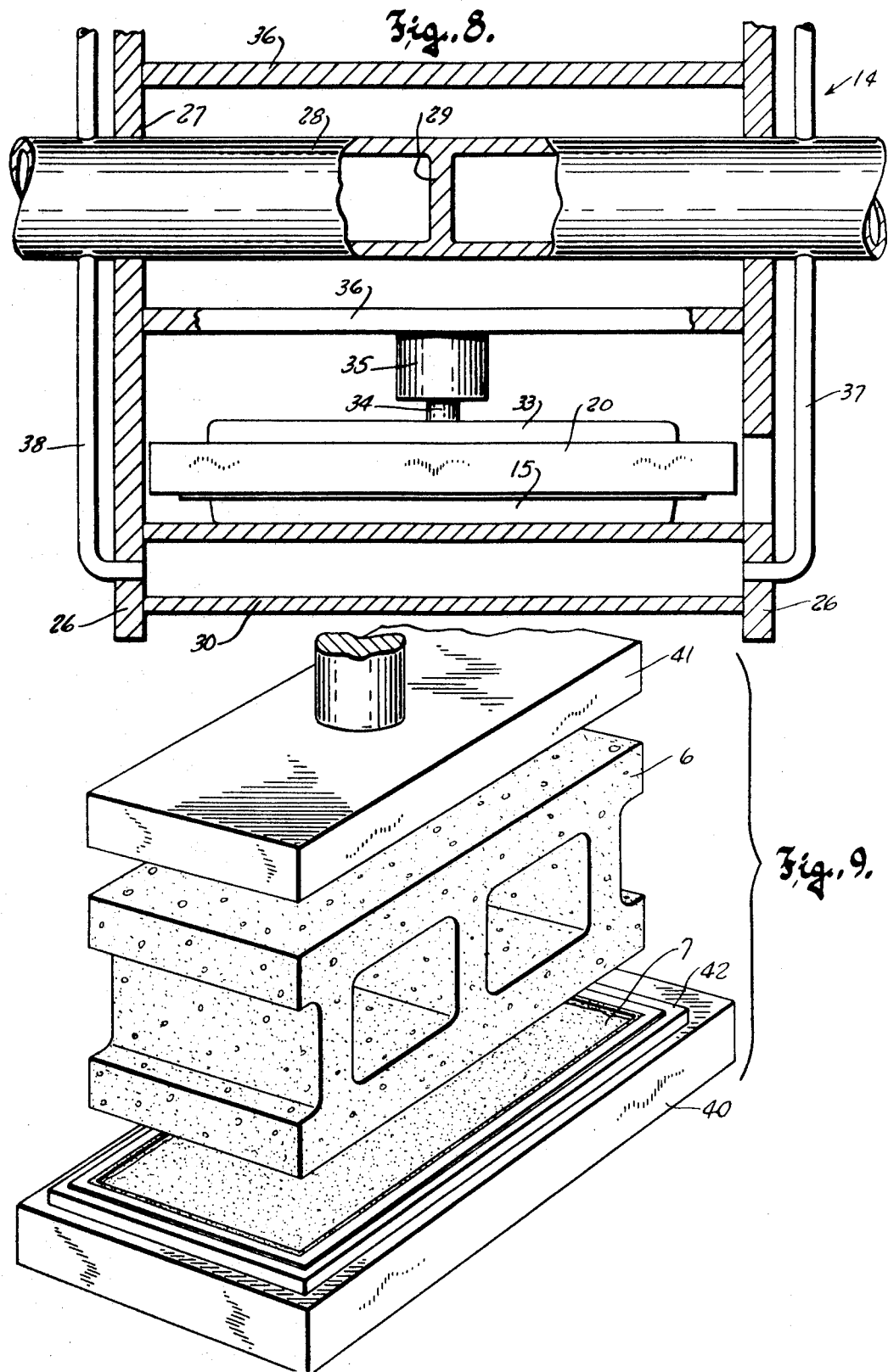

United States Patent Office 3,518,342
Patented June 30, 1970

3,518,342
CENTRIFUGAL MOLDING METHOD FOR MAKING FACING FOR BUILDING BLOCKS
Raymond N. Logan, Farmers Branch, Tex., assignor to Broadway Finance Corporation, Milwaukee, Wis., a corporation of Wisconsin
Continuation-in-part of application Ser. No. 441,188, Mar. 19, 1965. This application Nov. 15, 1968, Ser. No. 815,507
(Filed under Rule 47(b) and 35 U.S.C. 118)
Int. Cl. B29c 5/04
U.S. Cl. 264—257                                    7 Claims

ABSTRACT OF THE DISCLOSURE

A light weight shallow pan-shaped cap for facing a concrete building block is produced by:

(1) pouring polymerizable synthetic resin containing a particulate mineral appearance-producing substance into a flat-bottomed pan-shaped female mold section;

(2) laying a fiber glass reinforcing mat into the resulting pool of resin;

(3) setting a block-like male mold section of a size and shape to nest within the female mold section, onto the contents of the female mold section with the two mold sections in nested relation; but with their contiguous sides spaced apart a distance to permit the resin to rise therebetween; and (4) applying heat to the assembly while rotating it about a fixed axis with the female mold section radially outermost and firmly supported against the thrust of centrifugal force, but with the male mold section supported against outward force only by the mold contents so that centrigual force acting on the assembly compacts the mold contents between the nested mold sections to form the same into the desired shape with the outer surface thereof defined by an uninterrupted homogeneous layer of resin. When the resin is set, the mold is opened and the product formed therein is removed.

---

This invention relates to building material and more particularly to building blocks of the type customarily referred to as concrete blocks, and this application is a continuation in part of the application Ser. No. 441,188 filed Mar. 19, 1965 now abandoned.

The purpose and object of this invention is to provide a concrete block with a distinctively appearing and textured face, and also to provide a practical and inexpensive method of making such blocks.

There is, of course, nothing new in the concept of a building block with an attractive face, but heretofore all attempts to achieve this objective failed for one reason or another. High cost was one of the most common explanations of why prior attempts did not succeed. Another was the fact that the facing was formed in situ, that is, directly on the block so that it was the block manufacturer who had to be depended upon not only to make the block but also to provide it with the desired facing.

Because of transportation costs concrete block manufacturers usually serve only a relatively small area. The ratio of economically practicable capital investment to attainable sales is thus quite low, so that any method which requires duplication of costly investment by the many block manufacturers is doomed from the start.

The block facing of this invention is a relatively thin shell of polymerized resin with finely divided or particulate natural stone—marble, for instance—and a suitable reinforcing embedded therein. While such facing in themselves are not new, no one before the been able to produce these facings in a commercially practicable way. The Rubenstein Pat. No. 2,951,001, is an example of a block with a facing of this type, but as in all other prior attempts to provide concrete blocks with such polymerized resin facings, Rubenstein applied pressure on the facing as it was formed. This pressure was applied by placing the complete assembly comprising the pan-like mold containing the plastic material with the block seated thereon, into a press.

If the facing was to have a fine, smooth surface finish, which would be the case if a marble-like appearance was desired, the surface of the mold would have to be highly polished. Unfortunately, though, the mold surface did not retain its polish very long if particulate stone or the like was used to give the facing a unique appearance. During the pressure application the particulate stone, which of course is quite abrasive, was pushed to the surface of the resin and forced into contact with the mold. The result was a scratched and otherwise defaced mold surface within a very short time, so that the molds had to be continually replaced.

But the main objection to these past methods, like that of the Rubenstein patent, was the fact that the facings were actually formed on the blocks.

All of the objections to past attempts to provide building blocks with distinctively appearing and textured faces are overcome by this invention. Thus, instead of proceeding along the well traveled path of forming or producing the desired face on the block, this invention contemplates the production of thin facing caps which are entirely separate from the concrete blocks, but can be easily secured thereto. These caps are formed essentially of a thermosetting resin with suitable reinforcing, and finely divided marble, granite, or other appearance-imparting aggregate embedded therein. With this procedure, the facing caps can be produced in one location by people well skilled for the purpose, and shipped in stacked or nested relation to the block manufacturers who apply them to the blocks they make, without the need for costly equipment or highly skilled help.

Commercially practicable methods of producing products of thermosetting resin in the past have always required the use of pressure and heat, the pressure to effect densification and deaeration and the heat to hasten polymerization. It was the pressure requirement which proved the stumbling block to many who heretofore sought to produce concrete block facings of thermosetting resin with stone particles embedded therein to give the facings the desired appearance, since all conventional ways of producing the pressure soon ruined the surfaces of the molds used in the process. By contrast, the present invention achieves densification and deaeration of the resin in a way which completely eliminates the destructive effect which the abrasive stone particles had upon the mold or die surfaces in the methods heretofore employed wherein these results were obtained by applying pressure in the conventional way upon the resin as polymerization took place.

Very briefly, the key to the success of this invention resides in using centrifugal force to produce densifying and deaerating pressure upon the resin as polymerization proceeds.

The manner in which the invention attains the aforesaid objects will be clear from the following description in which reference is made to the accompanying drawings which illustrate one embodiment of the invention, and in which:

FIG. 1 is a cross sectional view through FIG. 1 on the plane of the line 2—2;

FIG. 7 is an end view of a machine adapted to receive a number of filled molds and to simultaneously subject them to centrifugal force, parts of the machine being broken away and shown in cross section;

FIG. 8 is a longitudinal sectional view through the machine, but showing only one of the filled molds in position therein; and FIG. 9 is a perspective view, more or less diagrammatically illustrating the manner in which the caps are attached to the blocks.

Referring now particularly to the drawings, the numeral 5 designates the ultimate finished product of this invention—namely, a building block, specifically a concrete block 6, with a facing 7 which gives the block a distinctive appearance and texture at least on one face or side thereof. Obviously, the opposite side of the block could also be provided with such a facing.

The block 6 is conventional and representative of concrete blocks made by block manufacturers all over the country, every one of which ordinarily serves only a local market, the area of which is generally limited by transportation costs.

Figure 1:
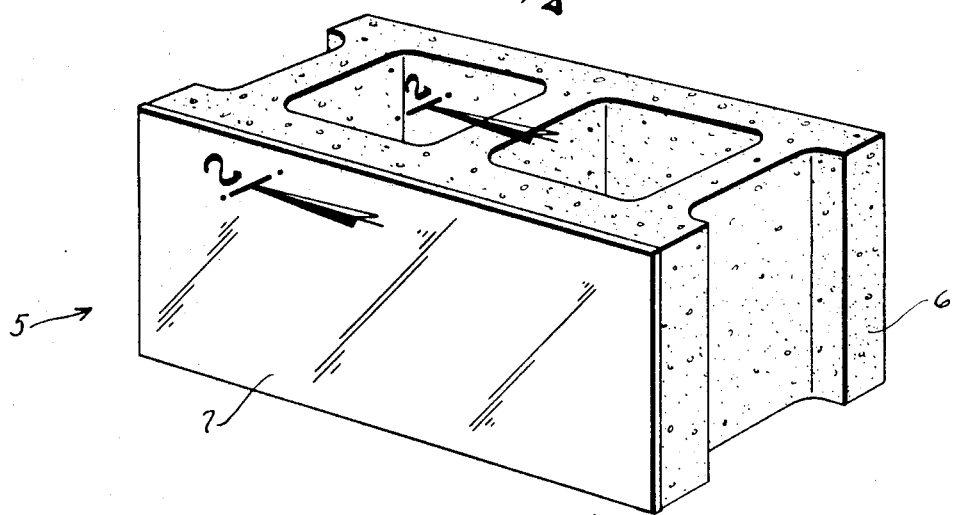
FIG. 1 is a perspective view of a conventional concrete block equipped with a facing cap in accordance with this invention.
Figure 2:
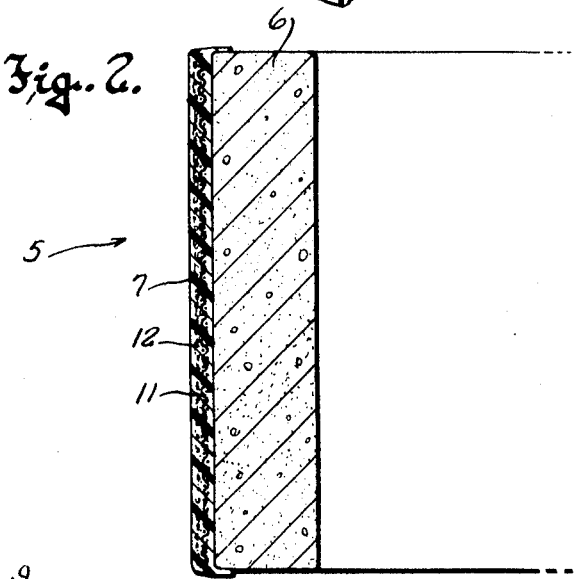
Figure 3:
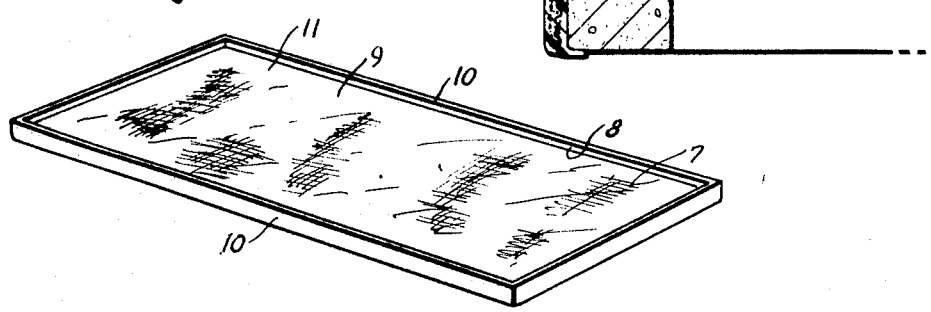
FIG. 3 is a perspective view of the facing cap of this invention.

The facing 7, however, and the method of making it are not conventional, nor is the fact that the facing is not formed on the block but instead is produced entirely independently of the block at a point which may be far removed from the local block manufacturers. Thus, as shown in FIG. 3, the facing is actually a shallow pan-like cap 8 having a flat wall 9 of a size commensurate with the side of the concrete block to which the cap is to be applied, and a low or narrow side wall 10 extending continuously around the perimeter of the cap.

The cap has a substantially uniform wall thickness and consists essentially of polymerized synthetic resin. To give it the needed strength, the resin contains a suitable reinforcing medium or material, which may be glass fibers, preferably in the form of a mat 11 coextensive in area with the cap and extending around the marginal edges of its flat main wall 9, and into the low, narrow side walls 10. If desired, the reinforcing may be doubled at the corners of the cap.

To give the cap a distinctive appearance, the resin has finely divided or particulate natural stone 12 distributed therein, but a characteristic of the invention is that none of this aggregate is exposed at the outside surface of the cap which provides the face of the block; and also, that a layer of resin containing the appearance-producing aggregate lies in front of the fiber glass reinforcing 11.

The selection of the particular synthetic resin used in the production of the facing cap forms no part of this invention, except that it must be a thermosetting polymerizable resin. Polyester resins have been used and are especially well suited to the purpose, but it should be understood that advances in the resin art are being made continually so that in the future resins that are not now available might very well be far better suited to the purpose than the polyester resins that have been used.

The appearance-producing ingredient may be any mineral substance such as finely divided marble, granite, silica sand, or even glass. The particle size of the aggregate used, though not too important, should not exceed approximately one-sixteenth of an inch, nor should it be so fine as to be considered powder. It is important, however, that the aggregate used be thoroughly dispersed throughout the viscous liquid resin so that every particle of the aggregate will be enveloped by a shell or film of viscous resin.

If desired, a suitable coloring ingredient may be added to the resin.

Figure 4:
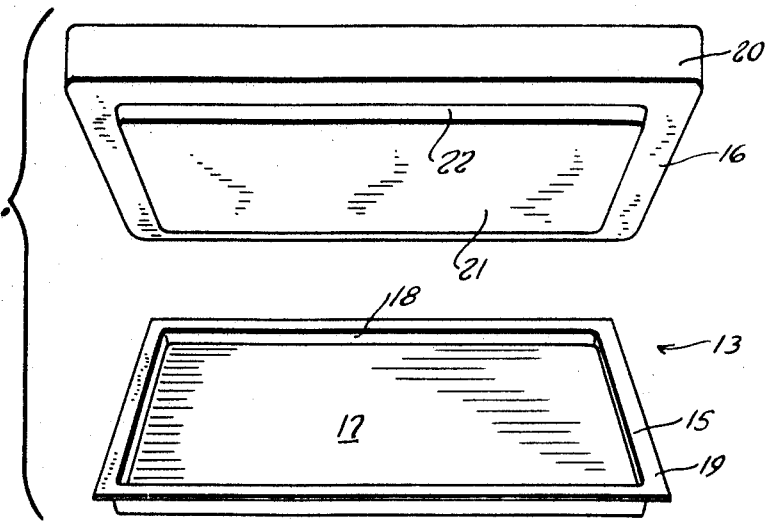
FIG. 4 is a perspective view of the mold used in the production of the facing cap, and showing that the mold comprises upper and lower separable sections.
Figure 5:
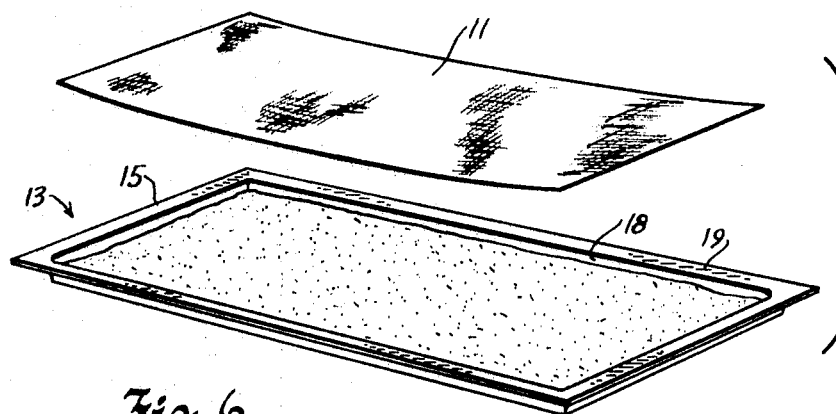
FIG. 5 is a perspetcive view of the lower female mold section containing a quantity of polymerizable synthetic resin with an appearance-producing ingredient distributed therein, and about to have a reinforcing mat of glass fibers laid thereon.
Figure 6:
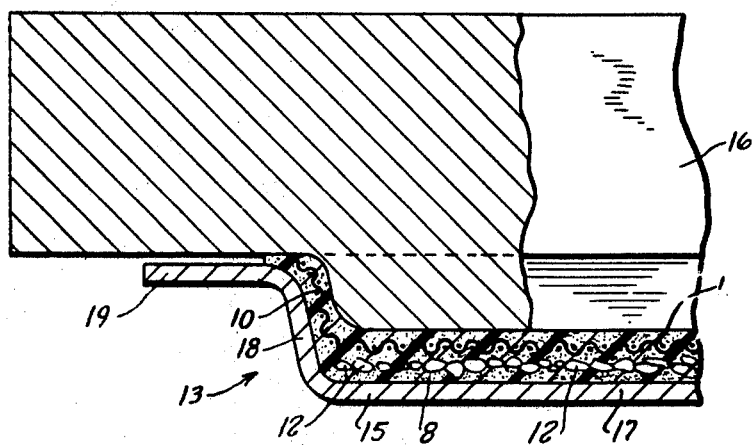
FIG. 6 is a cross sectional view, on an exaggerated scale, through one end portion of a filled mold illustrating the manner in which the two mold sections coact when subjected to centrifugal force to form the pan-shaped cap.

The equipment needed to produce the facing caps consists of a supply of molds, one of which, designated generally by the numeral 13, is shown in FIG. 4, and a machine 14 by which a number of filled molds may be simultaneously spun to subject their contents to centrifugal force. The molds are identical with one another and each consists of a female lower section 15 and a male upper section 16. The female lower section is essentially a pan preferably stamped from sheet metal and having a flat bottom wall 17 and a side wall 18 extending continuously around the perimeter of the bottom wall. The side wall slopes outwardly, as shown, and is joined to the bottom wall with a rounded or curved fillet; and an outwardly projecting flange 19 projects from the top edge of the side wall.

The inside surface of the female mold section should have a very smooth surface if the facing cap is to produce the effect of marble or other similar stone. In any event, it is this surface of the mold which defines the texture of the outer surface of the facing cap. Where a smooth surface is desired, it has been found preferable to porcelainize the inside surface of the female mold section.

The male mold section consists of a flat block 20 of any suitable material having sufficient density and mass to give it appreciable weight. Only the underside of the male member is important from the standpoint of shape, since it defines the contour and size of the inside of the facing cap and thus determines how well the cap will fit a concrete block. Accordingly, the underside of the male mold section has a flat surface 21 of the same size as the side of the block to be faced, circumscribed by narrow sloping sides 22.

The contiguous faces and sides of the two mold sections are identical in size and shape so that in the absence of any material between them the mold sections nest one within the other. In fact, the female mold section can be used to define the shape of the underside of the male section, if the male section is formed of material which lends itself to being shaped by a mold. Such identity of shape between the contiguous faces of the mold sections, however, is possible only because of the sloping disposition of their sides 18 and 22.

Figure 7:
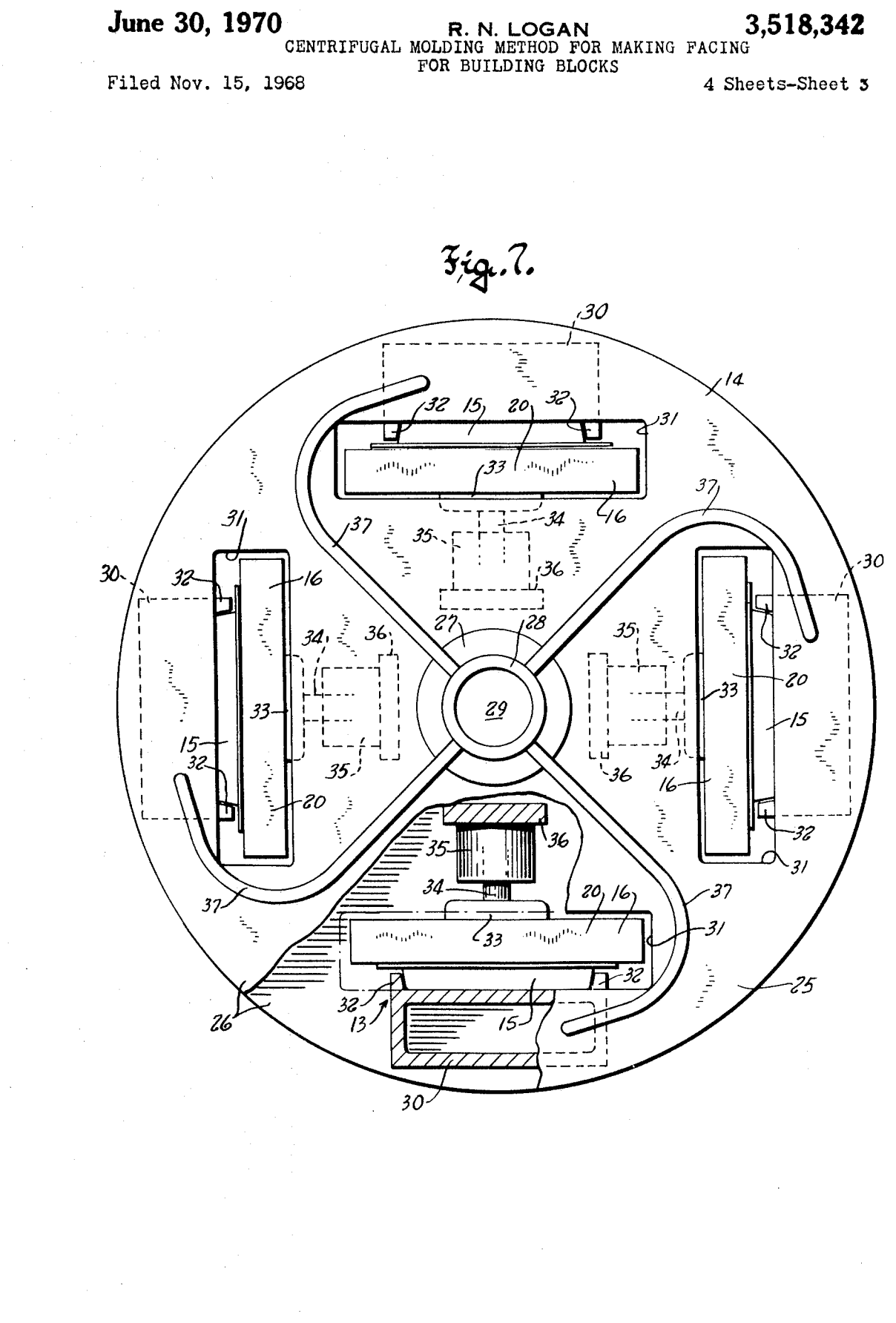

The machine 14 has some of the characteristics of a ferris wheel since it consists essentially of a rotor 25 adapted to carry a plurality of filled molds. The rotor 25 may be of any suitable construction and, in the machine illustrated in FIGS. 7 and 8, it is essentially a spool with flanges 26 connected by a hub 27. A hollow shaft 28 coaxial with the spool mounts the same in bearings, not shown, and any suitable means, also not shown, may be provided to revolve the rotor. For a purpose to be described, a partition wall 29 divides the interior of the hollow shaft into two separate chambers.

At equispaced points the flanges 26 are connected by hollow cross members 30. The radial inner surfaces of these cross members are flat and of a size to accommodate and support one of the filled molds which may be slid onto the cross members through access openings 31 in one of the flanges 26. The cross members 30 thus may be considered mold carriers, and as will be readily understood these carriers are best loaded and unloaded when they are at the lowermost point in their circular orbit, it being understood that the axis of the rotor is horizontal. To guide a mold onto a carrier being loaded, the cross members 30 have upstanding side flanges 32 between which the lower female section of the mold is received.

A mold slid into position onto one of the hollow cross members 30 when the latter is in its loading or unloading position, i.e. at the bottom of the "ferris wheel," is held in place on the cross member by a retaining member 33 carried by the rotor in position to engage the top of the upper male section of the mold. This retaining member 33, of which there is one for each mold carrier, may be mounted and actuated to and from its operative position in any suitable manner. In the machine illustrated, it is carried by the plunger 34 of a hydraulic or pneumatic cylinder 35 fixed to a cross piece 36 that spans the distance between and is fixed to the flanges 26. Thus, when a mold has been slid into position, the adjacent cylinder 35 can be actuated to bring its respective retaining member 33 into its operative position holding the mold closed and against displacement from its proper place on the cross member 30 as the rotor is intermittently turned to bring the successive cross members into loading position. Since the plunger 34 has a fixed stroke, it performs its holding function without placing pressure on the mold contents or in anywise interferring with the effects of centrifugal force upon the mold contents or upon the male mold section as the rotor spins. In other words, after all of the mold carriers of the rotor have been loaded and the rotor begins to spin, the retaining members 33 perform no function. During the spinning of the rotor the filled molds are held in place by centrifugal force.

The cross members 30 not only serve as carriers for the molds but, being hollow, also provide a convenient way of applying heat to the molds and their contents. To this end, each hollow cross member 30 has one end thereof connected with the hollow shaft at one side of its partition wall 29 and its other end connected with the hollow shaft at the opposite side of the partition wall. This may be done by tubes 37 and 38, as seen in FIG. 8. Hot oil or other fluid heating medium thus may be continuously pumped into one end of the hollow shaft, circulated through the hollow cross members, and out of the other end of the shaft.

In practice, the female mold sections are brought to a "filling station" where a quantity of the synthetic resin in the liquid state is poured into each. The appearance-producing ingredient, that is, the particulate marble, granite, or other similar substance—and coloring, it used—has of course been added to the resin and properly dispersed therein; and as is customary in the formation of objects from thermosetting resins, a suitable catalyst or polymerization accelerator such as M.E.K. (methyl, ethyl, ketone) and cobalt naphthanate is added to the resin just before it is poured into the mold.

The thus prepared resin which as is well known is quite viscous is spread over the bottom of the female mold section into a layer of substantially uniform depth or thickness. This may be done by subjecting the mold section with its contents to vibration in any suitable manner.

The glass fiber mat or other reinforcing material is now laid onto the resin layer without disrupting the continuity of the resin covering the bottom of the female mold section, and with the marginal portions of the mat extending over the sides of the mold. If desired additional reinforcing may be provided at the corners by placing small pieces of glass fiber mat at these points. In any event, the glass fibers are thoroughly wetted with the resin for which purpose it is desirable to withhold some of the quantity of resin needed to form one cap until the glass fiber mat has been laid in place and then pour it over the mat.

The male mold section is now set onto the filled mold section and as it is the marginal portions of the resin and the fiber glass mat may begin to rise between the sloping side walls of the mold sections.

The filled and assembled mold is taken to the machine 14, loaded onto one of its cross members or mold carriers 30, and by means of the adjacent retaining member 33 is held on the carrier 30 as the rotor is intermittently turned to successively bring its several carriers into loading position. When all the carriers 30 are thus loaded, the rotor is spun while at the same time hot oil courses through the hollow carriers to heat the mold contents. As the rotor spins the mold contents and the male mold sections are of course subjected to the effects of centrifugal force.

Because of the dimensional and angular identity of the sloping side walls of the mold sections, the side walls are spaced from one another by the mold contents between their flat bottom surfaces. The distance between the side walls of all of the molds carried by the rotor is substantially uniform when the rotor begins to spin since nothing but the mold contents and centrifugal force acting thereon and on the male mold sections has any bearing upon the relative positions of the complementary sections of each mold. The male mold sections are thus completely free to accommodate themselves to their respective female mold sections since nothing but the mold contents supports the male sections against the effects of centrifugal force thereon.

By virtue of this freedom of the male mold sections the lip which is formed by the marginal portions of the mold contents being forced to rise into the space between the sloping side walls of the mold sections as the male mold section moves into the female section in response to centrifugal force, is substantially uniform in thickness and height; there is, therefore, no need to constrain the mold sections to exact alignment as by guide pins. From a production standpoint, this is an important consideration.

A most significant attribute of the use of centrifugal force to produce the facing caps of this invention resides in the fact that it achieves densification and deaeration of the resin and formation of the same into the desired shallow pan shape without having any of the particles of appearance producing aggregates break through the surface of the resin in contact with the polished inner face of the female mold section. As a result the outer face of the finished cap has an uninterrupted smooth resin surface and the important polished face of the female mold section is in nowise marred. The explanation for this phenomenon no doubt lies in the natural viscosity of the resin which keeps the resinous film that envelopes each particle of aggregate intact and thus prevents exposure of the particle and contact thereof with the mold surface.

Another advantages of using centrifugal force to produce the facing caps in the manner described is that it drives nay entrapped air from the resin at the inner face of the cap and thus assures that the surface layer at the front face of the cap will be entirely free of pin holes or voids caused by air entrapment.

In practice it has been found that with the filled molds spaced about eighteen inches from the center of gyration and spun at 200 r.p,m., one and one half minutes is sufficient time to obtain the results sought. By this time the heat of the hot oil circulating through the hollow carriers and the effect of the catalyst have brought about sufficient polymerization to give the resin form retention. However, it is preferable to leave the resin in the molds until it is cured sufficiently to guard against warping or other deformation, it being understood of course that the molds with their contents are removed from the machine at the completion of the spinning operation.

After the resin has been sufficiently cured to assure form retention, the molds are opened and the formed pan-like facing caps are removed. The shape of the caps adapts them to being nested one within the other, and in this stacked or nested condition they are packaged and ready for shipment to block manufacturers.

The block manufacturer who buys the caps from the producer thereof, needs no costly equipment to apply the caps to his blocks. As shown in FIG. 9, a simple press with a heated lower platen 40 and a pressure applying head 41 is all that is needed. The platen 40, however, should have a frame 42 to locate the cap which is placed on the platen in an inverted position. Not only does the frame 42 properly locate the cap on the platen, but it also supports the side wall or lip of the cap against being spread outward. If desired, the cap may be first set into one of the female mold sections, as shown in FIG. 9, before it is placed on the heated platen, in which event the frame 42 would have to be slightly larger.

With a cap in position on the platen, the inner face of the cap and also the side of the block to which the cap is to be secured, or at least the marginal portion of that side of the block, is coated with an adhesive bonding medium which may be some of the same synthetic resin of which the cap is made, but containing a suitable filler to give it proper consistency. Those skilled in the art will have no difficulty selecting a suitable bonding medium.

The block is now set onto the adhesive coated inner surface of the cap, and then the pressure applying head 41 is lowered to apply pressure to the assembled block and cap, on the order of one or two pounds per square inch. This pressure and the heat derived from the heated platen quickly sets the bonding medium between the cap and the block and secures the two together with a bond that thus far has not been known to give way.

Although the foregoing description does not specify the proportions of the catalysts used or the amount thereof, these are matters well known to people versed in the resin art, and in fact are generally set forth by the manufacturers of resin in their instructions for use.

From the foregoing description and the accompanying drawings, it should be apparent to those skilled in the art that this invention provides a commercially practicable method of providing concrete blocks with distinctively appearing and textured facings.

What is claimed as my invention is:

1. The method of making a shallow pan-shaped cap for attachment to a building block, which comprises:
   (A) providing a mold consisting of a pan-shaped female mold section having a flat bottom bounded by outwardly sloping side walls, and a male section having a flat bottom and of a size to fit within the female mold section with the marginal edges of the male section adjacent to the sloping side walls of the female mold section, so that in the absence of any material between the mold sections their flat bottoms can have surface-to-surface engagement;
   (B) preparing a viscous resinous mixture by introducing particulate appearance-producing material of a particle size no larger than approximately one-sixteenth of an inch into a polymerizable synthetic thermosetting resin in the viscous liquid state and containing a catalyst to accelerate polymerization, and dispersing the particulate appearance-producing material throughout the resin so that each particle thereof is enveloped by a shell of viscous resin;
   (C) placing a quantity of said viscous mixture in the female mold section;
   (D) placing a reinforcing mat of fibrous material in the viscous resinous mixture in the female mold section in spaced relation to the bottom of said mold section with the reinforcing mat so disposed that an undisturbed homogeneous layer of said viscous resinous mixture lies between it and the bottom of the mold section;
   (E) placing the male mold section on the surface of the contents of the female mold section with the marginal edges of the male mold section substantially uniformly spaced from the outwardly sloping side walls of the female mold section to permit the mold contents to rise therebetween;
   (F) forcing the marginal portions of the mold contents to rise between the side walls of the female mold section and the adjacent marginal edges of the male mold section to form the same into an upstanding perimetral lip and at the same time densifying and deaerating the resin of the mold contents by swinging the filled and closed mold about a fixed axis with the female mold section radially outermost and firmly supported against the effects of centrifugal force and with its inner bottom surface facing the axis, but with the male mold section supported against the effects of centrifugal force only by the mold contents, the envelopment of each particle of appearance producing material in a shell of viscous resin assuring that the boundary surface of the mold contents in contact with the female mold section is devoid of any exposed appearance producing material;
   (G) applying heat to the mold contents while the same is being subjected to the effects of centrifugal force;
   (H) terminating the swinging of the mold when the resin has been polymerized sufficiently to give it a form retaining set;
   (I) opening the mold; and
   (J) removing the formed product therefrom.

2. The method of claim 1, wherein the particulate appearance-producing material is chosen from the class consisting of finely divided marble, granite, silica sand and glass.

3. The method of claim 1, further characterized by leaving the mold closed until the formed product therein has cured.

4. The method of claim 1, wherein the reinforcing mat is formed of glass fibers and is of a size to cover the entire open face of the female mold section with the marginal portions of the mat positioned to be embedded in the perimetral lip that is formed between the sloping side walls of the female mold section and the adjacent marginal edges of the male mold section as they approach one another in consequence of the response of the male mold section to centrifugal force.

5. The method of claim 1, wherein the swinging of the filled mold to subject the same to centrifugal force is done by completely rotating the same about a fixed axis.

6. The method of claim 5, wherein the axis about which the filled mold is rotated is substantially horizontal so that when the mold is at the bottom of its orbit the male mold section is uppermost and the pan-shaped female mold section faces upwardly.

7. The method of claim 1, wherein the female mold section is held with its flat bottom normal to a radian of the axis about which the filled mold is swung.

References Cited

UNITED STATES PATENTS

| | | | |
|---|---|---|---|
| 1,541,831 | 6/1925 | Linder | 264—311 |
| 2,541,297 | 2/1951 | Sampson et al. | |
| 2,972,785 | 2/1961 | Touceda | 264—311 |
| 3,150,032 | 9/1964 | Rubenstein | 264—271 |

ROBERT F. WHITE, Primary Examiner

G. AUVILLE, Assistant Examiner

U.S. Cl. X.R.

18—26; 25—41; 264—311